United States Patent
Koskinen

(10) Patent No.: US 9,769,792 B2
(45) Date of Patent: Sep. 19, 2017

(54) INCOMING CALL

(71) Applicant: Nokia Solutions and Networks Oy, Espoo (FI)

(72) Inventor: Henri Markus Koskinen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/785,870

(22) PCT Filed: Apr. 22, 2013

(86) PCT No.: PCT/EP2013/058242
§ 371 (c)(1),
(2) Date: Oct. 21, 2015

(87) PCT Pub. No.: WO2014/173427
PCT Pub. Date: Oct. 30, 2014

(65) Prior Publication Data
US 2016/0095084 A1    Mar. 31, 2016

(51) Int. Cl.
*H04W 68/02*     (2009.01)
*H04W 76/02*     (2009.01)
*H04L 12/18*     (2006.01)
*H04W 76/00*     (2009.01)
*H04W 48/20*     (2009.01)

(52) U.S. Cl.
CPC .......... *H04W 68/02* (2013.01); *H04L 12/189* (2013.01); *H04W 76/027* (2013.01); *H04W 48/20* (2013.01); *H04W 76/002* (2013.01)

(58) Field of Classification Search
CPC .... H04L 12/189; H04W 48/20; H04W 68/02; H04W 76/002; H04W 76/027; H04W 48/06; H04W 4/005; H04W 72/04; H04W 76/02
See application file for complete search history.

(56) References Cited

U.S. PATENT DOCUMENTS

| 8,588,105 | B2 * | 11/2013 | Engstrom | H04W 24/02 370/254 |
|---|---|---|---|---|
| 2003/0003928 | A1 | 1/2003 | Marjelund et al. | 455/464 |
| 2007/0104173 | A1 * | 5/2007 | Drevon | H04L 12/189 370/341 |
| 2012/0208542 | A1 * | 8/2012 | Yoshizawa | H04W 68/00 455/445 |
| 2013/0324141 | A1 * | 12/2013 | Jung | H04W 4/005 455/450 |

FOREIGN PATENT DOCUMENTS

| EP | 2257117 A1 | 12/2010 |
| WO | WO-00/78086 A1 | 12/2000 |

* cited by examiner

Primary Examiner — Nizar Sivji
(74) Attorney, Agent, or Firm — Harrington & Smith

(57) ABSTRACT

A user apparatus in an idle mode and prioritizing a radio resource (401) of a cell is configured to, in response to a paging message received over the cell (402) and a subsequent connection request rejection (404) received over the cell to determine whether or not to cease to prioritize (407) the radio resource.

17 Claims, 3 Drawing Sheets

INCOMING CALL

FIELD

The present invention relates to an incoming call in a mobile communication system.

BACKGROUND ART

The following description of background art may include insights, discoveries, understandings or disclosures, or associations together with dis-closures not known to the relevant art prior to the present invention but provided by the invention. Some such contributions of the invention may be specifically pointed out below, whereas other such contributions of the invention will be apparent from their context.

In recent years, the phenomenal growth of mobile Internet services and proliferation of smart phones and tablets has increased a demand for mobile broadband services. A multimedia broadcast-multicast service (MBMS) is designed to provide application independent transport for broadcast and multicast services by using a point-to-multipoint interface. Examples of services and applications that can be provided over MBMS include mobile TV and radio broadcasting, streaming video, streaming audio, file delivery and emergency alerts. MBMS may use an advanced counting scheme to decide, whether or not zero, one or more dedicated (i.e. unicast) radio channels lead to a more efficient system usage than one common (i.e. broadcast) radio channel. Hence, MBMS is advantageous when a large number of users are interested in same content. To receive a content delivered over MBMS, a user apparatus may receive information on a frequency over which the MBMS service of interest is provided, and may consider the frequency to be of the highest priority when the user apparatus is in an idle state, although other frequencies would be available for use. Should the cell on the frequency be a congested one and there is a mobile terminating call to the user apparatus that is in an idle state, there is a risk that the user apparatus will not be informed about the incoming call.

SUMMARY

A general aspect of the invention provides a solution in which a user apparatus is informed about an incoming call, for example, in a cell by paging the user apparatus. Various aspects of the invention comprise methods, apparatuses, a system and a computer program product as defined in the independent claims. Further embodiments of the invention are disclosed in the dependent claims.

BRIEF DESCRIPTION OF THE DRAWINGS

In the following, embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

The present invention is applicable to any system, radio access network, a network element, or a corresponding component and user apparatus that supports services obtainable by user apparatuses over one or more cells of a network when the user apparatuses are in idle mode for dedicated unicast services. The system may be a wireless system or a system utilizing both fixed connections and wireless connections. The specifications of different systems and networks, especially in wireless communication, develop rapidly. Such development may require extra changes to an embodiment. Therefore, all words and expressions should be interpreted broadly and they are intended to illustrate, not to restrict, the embodiment.

In the following, different examples will be described using, as an example of a service obtainable by user apparatuses over one or more cells of a network when the user apparatuses are in idle mode for the dedicated unicast services, the multimedia broadcast-multicast service, and as an example of the dedicated unicast service an incoming call, without restricting the examples to such services. A call means herein a connection over a network between a calling party and one or more called parties, a called party receiving an incoming call. Since the multimedia broadcast-multicast service may be prioritized by a user apparatus by giving a frequency over which the service is provided the highest priority, the examples use the frequency as an example of a radio resource that may be prioritized, without restricting the examples to the frequency. Another example of a radio resource that a user apparatus may consider as a heightened/highest-priority radio resource is time.

Figure 1:
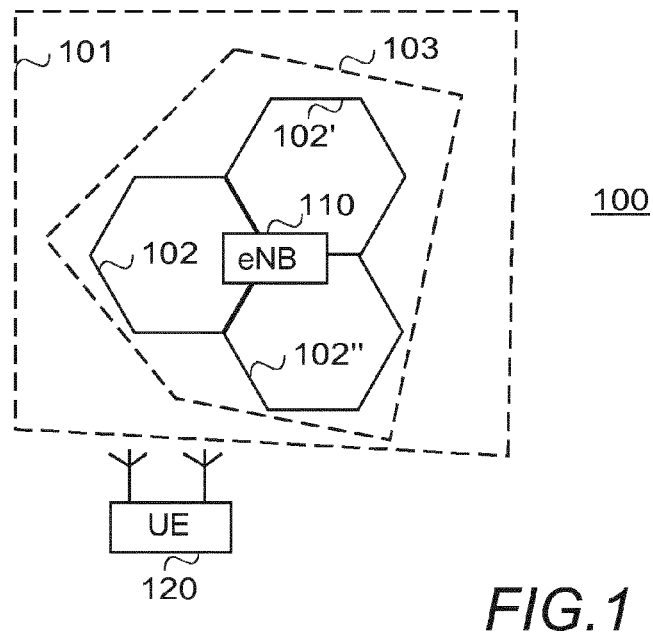
FIG. 1 shows simplified architecture of an exemplary system.

A general architecture of an exemplary system 100 providing multimedia broadcast-multicast services is illustrated in FIG. 1. FIG. 1 is a simplified system architecture only showing some elements and functional entities, all being logical units whose implementation may differ from what is shown. The connections shown in FIG. 1 are logical connections; the actual physical connections may be different. It is apparent to a person skilled in the art that the systems also comprise other functions and structures that are not illustrated.

In the embodiment illustrated in FIG. 1, the system 100 comprises a radio access network 101 providing access to the system for user apparatuses 120 (UE, user equipment, only one shown in FIG. 1) by means of access point nodes 110 (only one shown in FIG. 1).

The access point node 110, or any corresponding network entity, may be for a wireless system or for a system utilizing both fixed connections and wireless connections, and the access point node may be configured to support one or more wireless access. Examples of such systems/networks include LTE/SAE (Long Term Evolution/System Architecture Evolution) radio system, Worldwide Interoperability for Microwave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic widebandcode division multiple access (W-CDMA), high-speed packet access (HSPA), advanced LTE (LTE-A), and/or beyond LTE-A, and any combination thereof. The specifications of different systems and networks, especially in wireless communication, develop rapidly. Such development may require extra changes to an embodiment. Therefore, all words and expressions should be interpreted broadly and they are intended to illustrate, not to restrict, the embodiment.

In the example of FIG. 1, an evolved node B 110 (eNB) depicts the access point node and hence the radio access is based on LTE/SAE (Long Term Evolution/System Architecture Evolution) radio system, the radio access network 101 being E-UTRAN (evolved UMTS terrestrial radio access network). The evolved node B 110 provides the E-UTRA user plane (PDCP/RLC/MAC/PHY) and control plane (RRC) protocol terminations towards the user apparatus 120. Although not illustrated in FIG. 1, evolved node Bs are interconnected with each other and to EPC (evolved packet core), more specifically to a mobility management entity (not illustrated in FIG. 1) and to one or more serving gateways (not illustrated in FIG. 1), such as a multimedia broadcast-multicast service gateway. However, the present invention does not affect to them and therefore they are not described in more detail here.

The evolved node B 110 may be configured to serve one or more cells, also called sectors, depending on the configuration and type of an antenna. Common configuration include omni cell (360°), 3 sectors (3×120° or 6 sectors (3 sectors 120° wide overlapping with 3 sectors of different frequency). A cell may be a macro cell, an umbrella cell, a pico cell or a micro cell. In the example of FIG. 1, the evolved node B serves 3 cells 102, 102', 102", the cells belonging in the example to the same tracking area 103. It should be appreciated that the evolved node B may contain cells belonging to different tracking areas, whereas each cell can only belong to one tracking area.

The user apparatus 120 refers to a portable computing device (equipment), and it may also be referred to as a user terminal or mobile terminal. Such computing devices (apparatuses) include wireless mobile communication devices operating with or without a subscriber identification module (SIM) in hardware or in software, including, but not limited to, the following types of devices: mobile phone, smartphone, personal digital assistant (PDA), handset, laptop and/or touch screen computer, e-reading device, tablet, game console, notebook, and multimedia device. It should be appreciated that the user apparatus 120 is depicted to include 2 antennas only for the sake of clarity. The number of reception and/or transmission antennas may naturally vary according to a current implementation.

If the core network receives a call for a registered user apparatus, the mobility management entity has information on one or more tracking areas the user apparatus is registered to. The mobility management entity initiates a paging procedure by sending a paging request to each evolved node B with cells belonging to the one or more tracking areas.

Figure 2:
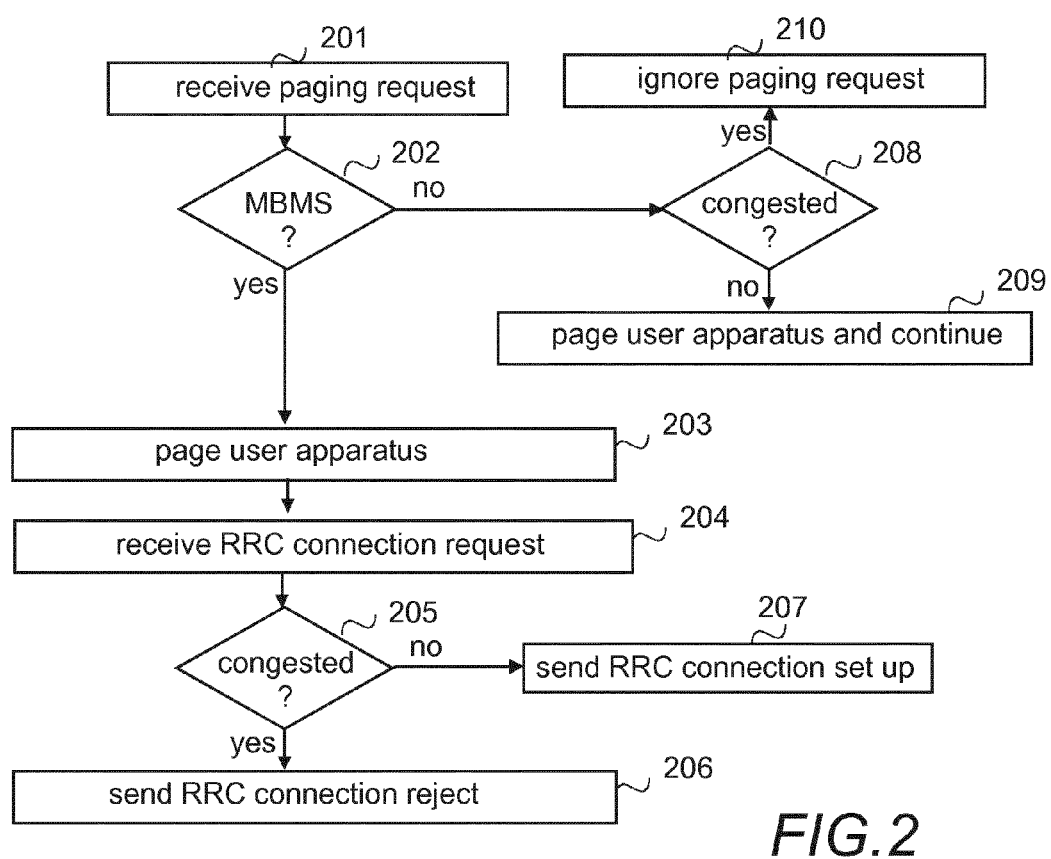
FIGS. 2 to 4 are charts illustrating exemplary functionalities.

FIG. 2 illustrates an exemplary functionality of an evolved node B when such a paging request is received from the mobility management entity. In the illustrated example the evolved node B serves cells providing multimedia broadcast-multicast services and cells not providing multimedia broadcast-multicast services. A further assumption made is that the evolved node B has been configured to decide whether or not to reject a connection establishment request received as a response to a paging message based on how congested the cell is without restricting the example to such a solution. One or more other criteria may be used instead of, or in addition to the congestion situation, and the evolved node B may be even configured to perform the decision arbitrarily.

Referring to FIG. 2, when the paging request is received in step 201, the evolved node B checks in step 202 for each served cell in the tracking area, whether or not the cell provides the multimedia broadcast-multicast services (MBMS). If the cell provides the multimedia broadcast-multicast services, the user apparatus is paged in step 203. If a connection request, such as an "RRC connection request", is received in step 204 from the user apparatus, it is checked, in step 205, whether or not the cell is congested. In other words, it is checked, whether or not a minimum guaranteed bit rate bearer is available for the call. If the cell is congested (step 205), the connection request is rejected by sending in step 206 a connection reject message, such as an "RRC connection rejected" to the user apparatus. If the cell is not congested (step 205) the connection request is accepted in step 207 by sending a corresponding message, such as an "RRC connection setup", and the call establishment may continue.

In the illustrated example, if the cell does not provide the multimedia broadcast-multicast services (step 202), it is checked, in step 208, whether or not the cell is congested. In other words, it is checked, whether or not a minimum guaranteed bit rate bearer is available for the call. If the cell is not congested (step 208) the user apparatus is paged in step 209, and the process continues by receiving a connection request, accepting it and continuing the call establishment. If the cell is congested (step 208), the evolved node B is not paging the user apparatus but ignores in step 210 the paging request.

Figure 4:
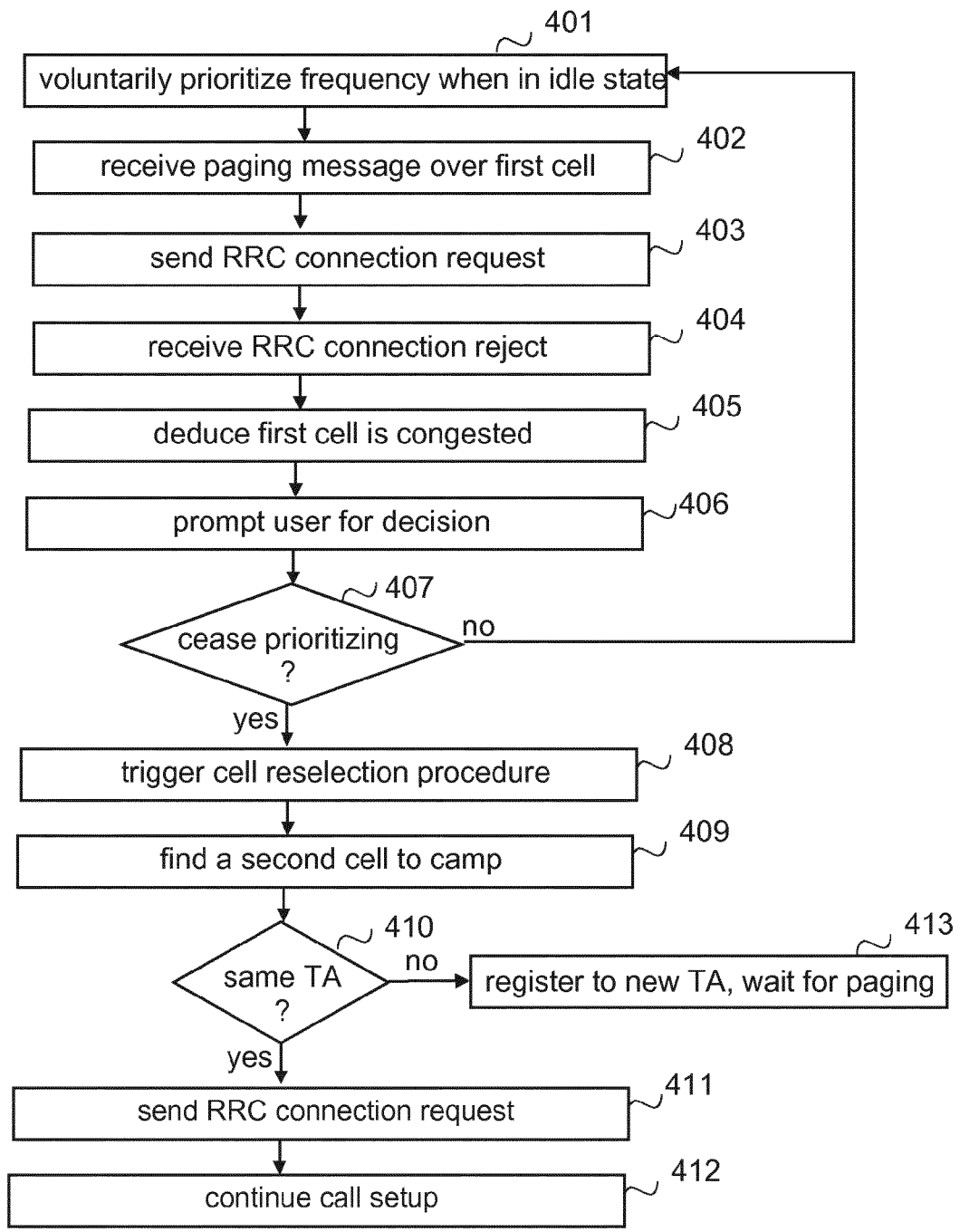

An advantage provided by paging a user apparatus in a cell providing the multimedia broadcast-multicast services even when the cell is congested is that the user apparatus that may have prioritized the frequency of the cell without the network side knowing that the user apparatus considers the frequency as a heightened/highest-priority frequency, is informed about the incoming call and may reconsider the prioritizing of the frequency and hence end up using resources of another cell, as will be disclosed below with FIG. 4. However, not paging a user apparatus in a congested cell not providing the multimedia broadcast-multicast services saves radio resources, since the reason for the user apparatus camping in the cell is not chosen by the user apparatus and the paging would not change the situation, so it would be performed in vain.

Figure 3:
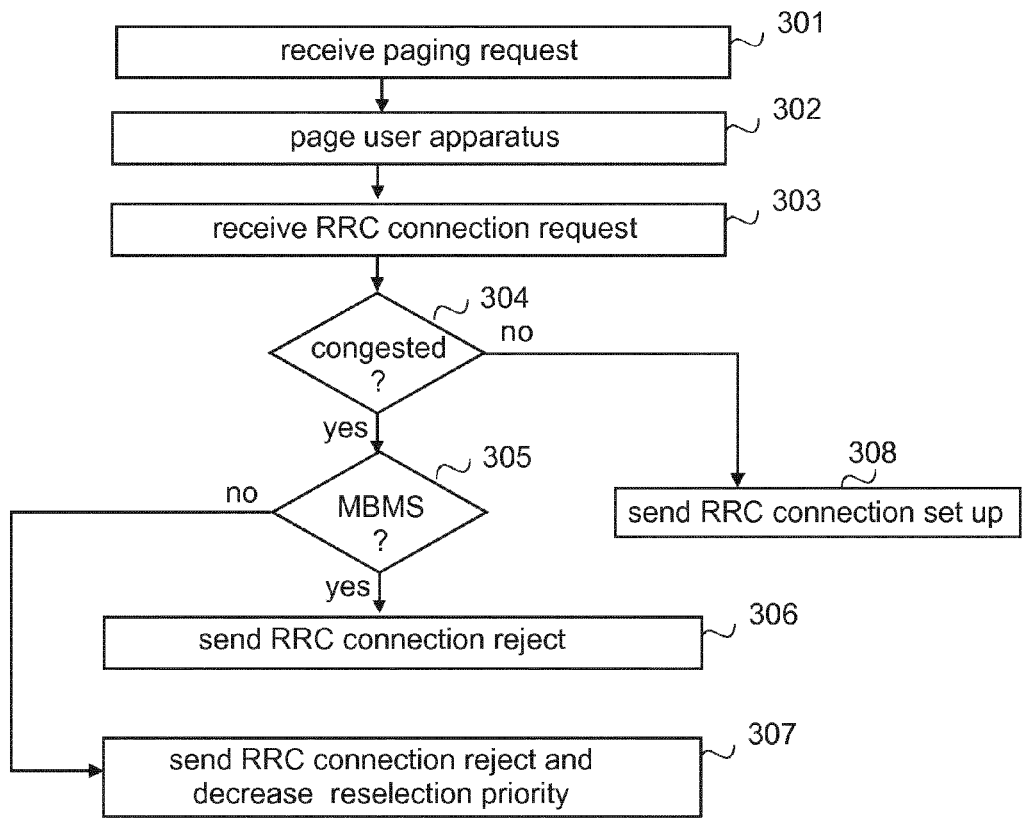

FIG. 3 illustrates another exemplary functionality of an evolved node B when a paging request is received from the mobility management entity. In the illustrated example the evolved node B serves cells providing multimedia broadcast-multicast services and cells not providing multimedia broadcast-multicast services. A further assumption made is the same as with the example of FIG. 2; the evolved node B has been configured to decide whether or not to reject a connection establishment request received as a response to a paging message based on how congested the cell is without restricting the example to such a solution.

Referring to FIG. 3, when the paging request is received in step 301, the evolved node B pages in step 302 the user apparatus. If a connection request, such as an "RRC connection request" is received in step 303 from the user apparatus over one of the cells, it is checked, in step 304, whether or not the cell is congested. In other words, it is checked, whether or not a minimum guaranteed bit rate bearer is available for the call.

If the cell is congested (step 304), it is checked, in step 305, whether or not the cell provides the multimedia broadcast-multicast services (MBMS). If the cell provides the multimedia broadcast-multicast services, the connection request is rejected by sending in step 306 a connection reject message, such as an "RRC connection reject" to the user apparatus.

If the cell does not provide the multimedia broadcast-multicast services, the connection request is rejected by sending in step 307 a connection reject message, such as an "RRC connection reject" to the user apparatus. Further, in the illustrated example, the reselection priority of the frequency of the cell is decreased in step 307. The latter causes user apparatuses, which are not considering the frequency as the heightened/highest frequency, to select another cell operating on another frequency.

If the cell is not congested (step 304) the connection request is accepted in step 308, by sending a corresponding message, such as an "RRC connection setup", and the call establishment may continue.

It should be appreciated that if the evolved node B serves only cell(s) providing the multimedia broadcast-multicast services, the checking steps 202 or 304 may be omitted, as well as steps 208-210 in the examples illustrated above.

FIG. 4 illustrates an exemplary functionality of a user apparatus in an idle mode.

Referring to FIG. 4, the user apparatus has voluntarily prioritized (step 401) a frequency providing the multimedia broadcast-multicast services and consequently reselected a cell on that frequency when it is in the idle state. The user apparatus may receive content over the multimedia broadcast-multicast services while it remains (step 401) in the idle state. The frequency is prioritized, i.e. considered as a heightened/highest-priority frequency by the user apparatus since the user of the user apparatus has activated reception of a broadcast service, such as MBMS service, delivered over a specific frequency.

Then a paging message for an incoming call is received in step 402 over the cell. In response to the paging message, the user apparatus sends in step 403 a connection request message, such as an "RRC connection request". However, a rejection to the connection request message, such as an "RRC connection reject" message, is received in step 404. The user apparatus is configured to deduce (step 405) that if a rejection message is subsequent to a paging message, the cell is congested, i.e. there is not enough free resources for the incoming call the user apparatus was paged for. Therefore the user is prompted in step 406 for a decision, whether or not to cease the prioritizing the frequency. In other words, the user is prompted to input the decision. Alternatively the user apparatus may be configured to decide whether or not to cease the prioritizing. For example, the user apparatus may be configured each time to decide to cease the prioritizing, or the user may have preset settings relating to the decision, the settings being either common to all MBMS services, or MBMS service-specific settings so that the user apparatus is configured to decide on the basis of the service obtained over MBMS. If the prioritizing the frequency is ceased (step 407), the user apparatus triggers in step 408 a cell reselection procedure during which it tries to find a cell fulfilling criteria for camping, and in the example illustrated such a second cell to camp is found in step 409. Then it is checked in step 410, whether or not the second cell belongs to the same tracking area (TA). If the first and second cell belong to the same tracking area the user apparatus sends in step 411 a connection request to the cell. Since the cell belongs to the same tracking area, paging was also broadcast in the new cell, and therefore the user apparatus can directly respond to the paging. Further, in the example it is assumed that the new cell is not congested and the call establishment may continue in step 412. The cell reselection procedure applies regular reselection priorities in which the user apparatus does not voluntarily prioritize a cell providing the multimedia broadcast-multicast service but instead applies network-provided cell reselection priorities to control idle mode camping.

If the cell does not belong to the same tracking area (step 410), the user apparatus registers in step 413 to a new tracking area and waits in step 413 for a new paging.

If the prioritizing the frequency is not ceased (step 407), no call is established but the user apparatus continues to stay in the idle state and prioritize the frequency (step 401). Hence, the user apparatus continues to be able to receive the MBMS service.

As is evident from the above, the fact that the user apparatus voluntarily prioritizing a cell may at any time cease to do so, is utilized to allow the user apparatus to determine whether or not to receive in incoming call over another cell.

Figure 5:
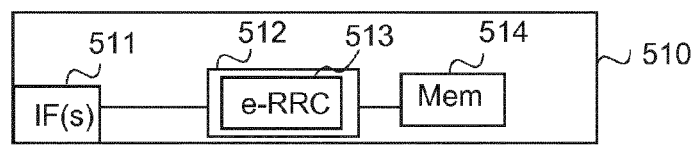
FIGS. 5 and 6 are schematic block diagrams of exemplary apparatuses.

FIG. 5 is a simplified block diagram illustrating some units for an apparatus 510 configured to provide an access point node, such as a base station provided by the evolved node B. In the illustrated example the apparatus comprises one or more interfaces (IF) 511, including one or more antennas, for receiving and transmitting information and for providing/serving one or more cells, a processor 512 comprising an enhanced radio resource control unit (e-RRC) 513 and memory 514 usable for storing a program code required for the enhanced radio resource control unit 513. The apparatus comprises the enhanced radio resource control unit 513 at least for sending radio resource connection rejection information over a cell over which a radio resource connection request was received when the cell is congested. The enhanced radio resource control unit 513 may be configured to implement a functionality based on a functionality described above with FIGS. 2 and 3.

Figure 6:
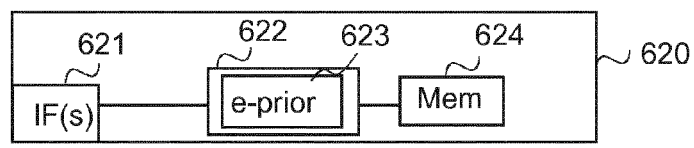

FIG. 6 is a simplified block diagram illustrating some units for a user apparatus 620. In the illustrated example the user apparatus comprises one or more interfaces (IF) 621, including one or more antennas, for receiving and transmitting information, a processor 622 comprising an enhanced prioritizing unit (e-prior) 623 and memory 624 usable for storing a program code required for the enhanced prioritizing unit 623. The apparatus comprises the enhanced prioritizing unit 623 at least for determining whether or not to cease to prioritize a radio resource based on a specific receiving order of paging and connection request rejection. The enhanced prioritizing unit 623 may be configured to implement a functionality based on a functionality described above with FIG. 4.

In other words, the apparatus 510 configured to provide the access point node (an exemplary block diagram of such an apparatus being illustrated in FIG. 5), and/or the apparatus 620 configured to provide the user apparatus (an exemplary block diagram of such an apparatus being illustrated in FIG. 6), is a computing device that may be any apparatus or device or equipment or network node configured to perform one or more of corresponding apparatus functionalities described with an embodiment/example/implementation, and it may be configured to perform functionalities from different embodiments/examples/implementations. The unit(s) described with an apparatus may be separate units, even locate in another physical apparatus, the physical apparatuses forming one logical apparatus providing the functionality, or integrated to another unit in the same apparatus. In other embodiments, a unit in an apparatus, or part of the unit's functionality, may locate in another physical apparatus. It should be appreciated that the apparatus may be in one physical apparatus or distributed to two or more physical apparatuses acting as one logical apparatus.

More precisely, the units and entities illustrated in FIGS. 1, 5 and 6 may be software and/or software-hardware and/or firmware components (recorded indelibly on a medium such as read-only-memory or embodied in hard-wired computer circuitry). The techniques described herein may be implemented by various means so that an apparatus implementing one or more functions of a corresponding apparatus/entity described with an embodiment/example/implementation comprises not only prior art means, but also means for implementing the one or more functions of a corresponding apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. For a firmware or software, implementation can be through modules (e.g., procedures, functions, and so on) that perform the functions described herein. Software codes may be stored in any suitable, processor/computer-readable data storage medium(s) or memory unit(s) or article(s) of manufacture and executed by one or more processors/computers.

An apparatus implementing functionality or some functionality according to an embodiment/example/implementation of an access point node or a user apparatus may generally include a processor, controller, control unit, microcontroller, or the like connected to a memory and to various interfaces of the apparatus. Generally the processor is a central processing unit, but the processor may be an additional operation processor. Each or some or one of the units/entities described herein may be configured as a computer or a processor, or a microprocessor, such as a single-chip computer element, or as a chipset, including at least a memory for providing storage area used for arithmetic operation and an operation processor for executing the arithmetic operation. Each or some or one of the units/entities described above may comprise one or more computer processors, application-specific integrated circuits (ASIC), digital signal processors (DSP), digital signal processing devices (DSPD), programmable logic devices (PLD), field-programmable gate arrays (FPGA), and/or other hardware components that have been programmed in such a way to carry out one or more functions of one or more embodiments. In other words, each or some or one of the units/entities described above may be an element that comprises one or more arithmetic logic units, a number of special registers and control circuits.

An apparatus implementing functionality or some functionality according to an embodiment/example/implementation of a macro base station, small base station, a centralized access router or a user apparatus (user equipment) may generally include volatile and/or non-volatile memory, for example EEPROM, ROM, PROM, RAM, DRAM, SRAM, double floating-gate field effect transistor, firmware, programmable logic, etc. and typically store content, data, or the like. The memory or memories may be of any type (different from each other), have any possible storage structure and, if required, being managed by any database management system. The memory may also store computer program code such as software applications (for example, for one or more of the units/entities) or operating systems, information, data, content, or the like for the processor to perform steps associated with operation of the apparatus in accordance with embodiments. The memory, or part of it, may be, for example, random access memory, a hard drive, or other fixed data memory or storage device implemented within the processor/apparatus or external to the processor/apparatus in which case it can be communicatively coupled to the processor/network node via various means as is known in the art. Examples of an external memory include a removable memory detachably connected to the apparatus, a distributed database and a cloud server.

An apparatus implementing functionality or some functionality according to an embodiment/example/implementation of an access point node, or a user apparatus generally comprise different interface units, such as one or more receiving units for receiving user data, control information, requests and responses, for example, and one or more sending units for sending user data, control information, responses and requests, for example. The receiving unit and the transmitting unit each provides an interface in an apparatus, the interface including a transmitter and/or a receiver or any other means for receiving and/or transmitting information, and performing necessary functions so that user data, control information, etc. can be received and/or transmitted. The receiving and sending units may comprise a set of antennas, the number of which is not limited to any particular number.

Further, an apparatus implementing functionality or some functionality according to an embodiment/example/implementation of an access point node or a user apparatus may comprise other units, like a user interface unit.

The steps and related functions and points described above in FIGS. 2 to 4 are in no absolute chronological order, and some of the steps may be performed simultaneously or in an order differing from the given one. Other functions can also be executed between the steps or within the steps. Some of the steps or part of the steps can also be left out or replaced by a corresponding step or part of the step. The messages (requests, responses, etc.) are only exemplary and may even comprise several separate messages for transmitting the same information, and the messages may use different protocols. In addition, the messages may also contain other information.

It should be appreciated that as used herein, the term "user apparatus" (UE) may be synonymous to a mobile station, mobile terminal, wireless terminal and/or remote station and may describe a remote user of wireless resources in a wireless communication network. The term "nodeB" or "access point" may be understood as a one or more cells, cell sites, base stations, transceivers, access points, and/or any terminus of radio frequency communication. Although current network architectures may consider a distinction between mobile/user devices and access points/nodeBs, the example embodiments described hereafter may generally be applicable to architectures where that distinction is not so clear, such as ad hoc and/or mesh network architectures, for example.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
    prioritizing a radio resource by a user apparatus in an idle mode, wherein the prioritizing the radio resource comprises treating the radio resource with a heightened cell-reselection priority relative to other radio resources;
    receiving by the user apparatus a paging message over a first cell operating on the radio resource;

sending a connection request as a response to the paging message;
receiving a rejection to the connection request;
determining whether or not to cease to prioritize the radio resource in response to receiving the paging message and the subsequent rejection, the determining comprising prompting a user for a decision as to whether or not to cease to prioritize the radio resource, receiving an input of the decision from the user, and using the decision; and
performing one of the following based on the determining:
in response to a determination by the user apparatus to cease to prioritize the first radio resource, performing a cell reselection to a second cell; or
in response to a determination by the user apparatus not to cease to prioritize the first radio resource, not establishing a call but continuing by the user apparatus to stay in the idle state and prioritizing the frequency.

2. A method as claimed in claim 1, further comprising:
checking, whether or not the first cell and the second cell belong to a same tracking area; and
responding to the paging message by sending a connection request to the second cell if the cells belong to the same tracking area.

3. A method as claimed in claim 1, wherein the determining whether or not to cease to prioritize the radio resource depends on a corresponding setting in the user apparatus.

4. A method as claimed in claim 1, wherein the radio resource is at least in part for providing one or more broadcast services.

5. A method as claimed in claim 4, wherein at least one of the broadcast services is a multimedia broadcast-multicast service.

6. A method as claimed in claim 1, wherein the user apparatus performs prioritizing the radio resource by considering the heightened cell-reselection priority to be a highest priority.

7. A method as claimed in claim 1, wherein the prioritizing the radio resource comprises considering a frequency for the radio resource to be a highest priority when the user apparatus is in an idle state and the user apparatus has activated reception of a multimedia broadcast-multicast service, although other frequencies are available for use.

8. A method as claimed in claim 7, wherein performing a cell reselection to a second cell comprises performing a cell reselection procedure by applying regular reselection priorities in which the user apparatus does not voluntarily prioritize a cell providing the multimedia broadcast-multicast service but instead applies network-provided cell reselection priorities to control idle mode camping.

9. A method comprising:
receiving a paging request for a user apparatus;
checking prior to paging the user apparatus over a cell, whether or not the cell provides at least one service obtainable by user apparatuses camping in the cell in an idle mode;
in response to the cell providing the at least one service obtainable by the user apparatuses camping in the cell in the idle mode, performing the paging over the cell; or
in response to the cell not providing the at least one service obtainable by the user apparatuses camping in the cell in the idle mode, checking whether or not there are enough radio resources for the connection in the cell, and performing the paging over the cell only if there are enough radio resources in the cell;
in response to the paging the user apparatus over the cell being performed, performing the following:
receiving as a response to the paging a connection request from the user apparatus over the cell, the connection request received in response to an input of a decision by a user at the user apparatus not to cease to prioritize a radio resource;
deciding not to establish the connection over the cell; and
sending a connection rejection to the user apparatus.

10. A method as claimed in claim 9, wherein the cell operates on a radio resource providing broadcast services.

11. A method as claimed in claim 10, wherein the radio resource is a frequency.

12. An apparatus comprising at least one processor, and one memory including computer program code, wherein the at least one memory and the computer program code are configured to, with the at least one processor, cause the apparatus to perform operations comprising:
prioritizing a radio resource by a user apparatus in an idle mode, wherein the prioritizing the radio resource comprises treating the radio resource with a heightened cell-reselection priority relative to other radio resources;
receiving by the user apparatus a paging message over a first cell operating on the radio resource;
sending a connection request as a response to the paging message;
receiving a rejection to the connection request;
determining whether or not to cease to prioritize the radio resource in response to receiving the paging message and the subsequent rejection, the determining comprising prompting a user for a decision as to whether or not to cease to prioritize the radio resource, receiving an input of the decision from the user, and using the decision; and
performing one of the following based on the determining:
in response to a determination by the user apparatus to cease to prioritize the first radio resource, performing a cell reselection to a second cell; or
in response to a determination by the user apparatus not to cease to prioritize the first radio resource, not establishing a call but continuing by the user apparatus to stay in the idle state and prioritizing the frequency.

13. An apparatus as claimed in claim 12, wherein the apparatus is a user apparatus and the radio resource is a frequency.

14. An apparatus comprising at least one processor, and one memory including computer program code, wherein the at least one memory and the computer program code are configured to, with the at least one processor, cause the apparatus to perform operations comprising:
receiving a paging request for a user apparatus;
checking prior to paging the user apparatus over a cell, whether or not the cell provides at least one service obtainable by user apparatuses camping in the cell in an idle mode;
in response to the cell providing the at least one service obtainable by the user apparatuses camping in the cell in the idle mode, performing the paging over the cell; or
in response to the cell not providing the at least one service obtainable by the user apparatuses camping in the cell in the idle mode, checking whether or not there are enough radio resources for the connection in the cell, and performing the paging over the cell only if there are enough radio resources in the cell;

in response to the paging the user apparatus over the cell being performed, performing the following:

receiving as a response to the paging a connection request from the user apparatus over the cell, the connection request received in response to an input of a decision by a user at the user apparatus not to cease to prioritize a radio resource;

deciding not to establish the connection over the cell; and sending a connection rejection to the user apparatus.

15. An apparatus as claimed in claim 14, wherein the apparatus is a base station.

16. A computer program product comprising a non-transitory computer-readable medium comprising program instructions adapted to cause an apparatus to perform the steps of the method as claimed in claim 1 when the program instructions are run on the apparatus.

17. A computer program product comprising a non-transitory computer-readable medium comprising program instructions adapted to cause an apparatus to perform the steps of the method as claimed in claim 9 when the program instructions are run on the apparatus.

* * * * *